Patented Oct. 22, 1946

2,409,685

UNITED STATES PATENT OFFICE 2,409,685

ADDITION PRODUCTS OF HETEROCYCLIC ZINC MERCAPTIDES WITH ALKYLENE IMINES

Paul C. Jones, near Chagrin Falls, and Roger A. Mathes, Akron, Ohio, assignors to The B. F. Goodrich Company, New York, N. Y., a corporation of New York No Drawing. Application December 21, 1944, Serial No. 569,278

6 Claims. (Cl. 260—302)

This invention relates to the addition products formed by the reaction between alkylene imines and zinc salts of heterocyclic nitrogen-containing mercaptans.

These products, the structure of which is not definitely known, are useful as accelerators and activators of vulcanization of rubber, although they may also be used as insecticides, fungicides, etc. Among the rubbers with which our new compounds may be used are all varieties of natural rubber, such as cautchouc, balata, gutta percha, latex, reclaimed rubber, and such synthetic rubbers as can be vulcanized with sulfur, such as polymers of butadiene, isoprene, 2,3-dimethyl butadiene, piperylene, and the like and copolymers of these compounds with acrylonitrile, styrene, methyl acrylate, methyl methacrylate, isobutylene, and other copolymerizable monomers. These new compounds may be added to the rubber on a roll mill or an internal mixer or by any other suitable method. Other compounding ingredients, such as any of the ordinary pigments, fillers, dyes, antioxidants, or other accelerators of vulcanization may be employed together with our new materials. Small quantities may be used to achieve the desired results, either as vulcanization activators or accelerators. In general 0.1 to 5% or more, based on the rubber composition, may be used.

According to our invention these addition products are prepared by reacting an alkylene imine with a zinc salt of a heterocyclic nitrogen-containing mercaptan, preferably in approximately equimolecular proportions and in the presence of any of the commonly used reaction diluents such as water, benzene, alcohol, and the like. Under such conditions the addition product forms as a precipitate which is readily isolated. It has been found that alkylene imines react, even at room temperature, with zinc salts of heterocyclic nitrogen-containing mercaptans. The reaction is generally smooth and the procedure simple.

The following specific examples will serve more fully to illustrate our invention.

The zinc salt of 2-mercaptothiozoline and ethylene imine are reacted in equimolecular proportions by slowly adding 21.5 grams of ethylene imine to a suspension of 91.5 grams of the zinc salt of 2-mercaptothiazoline in 500 cc. of benzene at 70° C. while stirring the reaction mixture. The white precipitate that forms, consisting of particles of larger size than those of the zinc salt of the 2-mercaptothiazoline suspension, is the addition product of the reaction. The resulting slurry is filtered and the precipitate dried. After drying, there was obtained 103.5 grams of the product which represents a 92% yield.

Other three-membered ring alkylene imines that can be substituted for ethylene imine in the above example are the homologous hydrocarbon-substituted ethylene imines, such as propylene imines and the like, without departing from the scope of our invention.

Zinc salts of other 2-mercaptothiazolines as well as the zinc salts of mercapto alkyl thiazoles, mercapto arylene thiazoles, mercapto oxazolines, mercapto quinolines, mercapto thiodiazoles, mercaptoimidazoles, xanthogenic acids, and dithiocarbamic acids may be substituted as equivalents for the zinc salt of 2-mercaptothiazoline in the above example to produce their respective addition products with equally good results.

The addition products of the reaction between the alkylene imines and zinc salts of heterocyclic nitrogen-containing mercaptans are all good accelerators.

As an indication of the ability of these compounds to accelerate vulcanization, the following example illustrates the effect produced in rubber by the product of the reaction between the zinc salt of 2-mercaptothiazoline and ethylene imine. A typical tire tread stock of the following composition, in which the parts are by weight, was prepared:

| | Parts |
|---|---|
| Rubber | 100.00 |
| Zinc oxide | 3.25 |
| Sulfur | 3.25 |
| Pine oil | 3.00 |
| Cotton seed fatty acid | 3.00 |
| Channel black | 60.00 |
| Antioxidant | 1.00 |
| Above reaction product as accelerator | 0.85 |

After vulcanization in a press at 280° F., the composition had the physical properties as shown in the following table, in which T is the ultimate tensile strength in lbs./sq. in. and E is the ultimate elongation in percent:

| Time of vulcanization in minutes | T | E |
|---|---|---|
| 15 | 2,950 | 660 |
| 45 | 3,640 | 600 |
| 150 | 3,000 | 500 |

Without an accelerator the above stock could be vulcanized in about three hours, but the resulting tensile strength would be only about one-half of the above values. But equally good results may be obtained using other similar addition products of any of the alkylene imines with any of the zinc salts hereinabove mentioned.

The complex formed by reacting the zinc salt of 2-mercaptothiazoline and ethylene imine is not only a more active vulcanization accelerator than the zinc salt of 2-mercaptothiazoline, but is not as sensitive to the activating effect of fatty acid. This complex gives good results in the absence of fatty acid.

These new products are quite stable and are capable of being stored for long periods of time at room temperature without deterioration.

Although we have described the preparation of these products carried out in benzene as the reaction diluent, any of the common reaction diluents, such as water, alcohols, ethers, gasoline, etc., may likewise be used as reaction diluents.

Although we have herein described specific embodiments of our invention, we do not intend to limit ourselves solely thereto, but only to the extent indicated in the appended claims.

We claim:

1. The addition product of an alkylene imine having its imino nitrogen atom attached to two carbon atoms which are directly connected one to another, with a zinc salt of a heterocyclic nitrogen-containing mercaptan.

2. The addition product of equimolecular portions of an alkylene imine having its imino nitrogen atom attached to two carbon atoms which are directly connected one to another, and a zinc salt of a heterocyclic nitrogen-containing mercaptan.

3. The addition product of ethylene imine and a zinc salt of a heterocyclic nitrogen-containing mercaptan.

4. The addition product of equimolecular portions of ethylene imine and a zinc salt of a heterocyclic nitrogen-containing mercaptan.

5. The addition product of ethylene imine and the zinc salt of 2-mercaptothiazoline.

6. The addition product of equimolecular portions of ethylene imine and the zinc salt of 2-mercaptothiazoline.

PAUL C. JONES.
ROGER A. MATHES.